Jan. 16, 1951     J. C. J. BLOSSE     2,538,077
OPTICAL VIEWER
Filed March 24, 1949     3 Sheets-Sheet 1
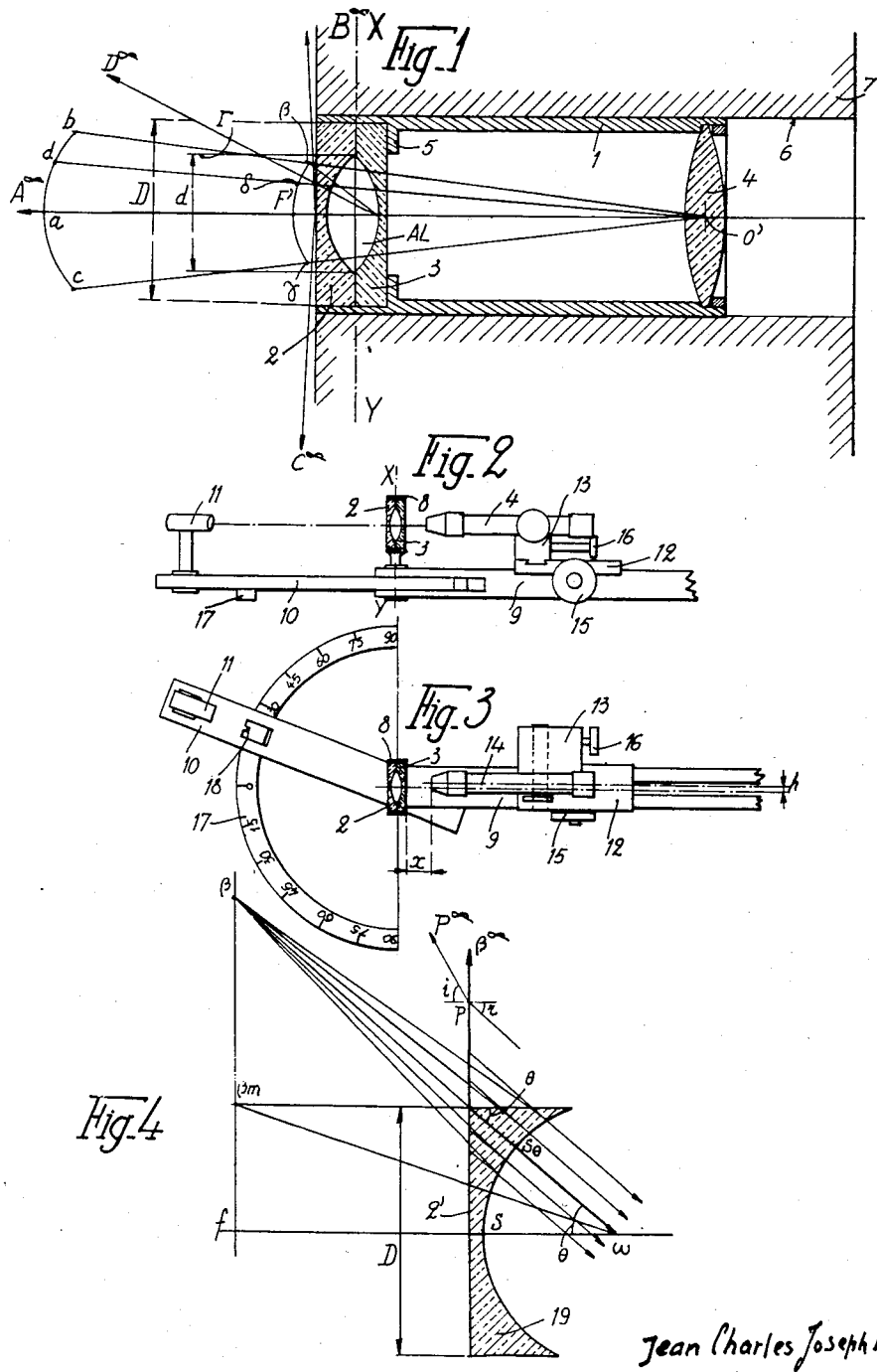
Jean Charles Joseph Blosse
Inventor Jan. 16, 1951   J. C. J. BLOSSE   2,538,077
OPTICAL VIEWER
Filed March 24, 1949   3 Sheets—Sheet 2
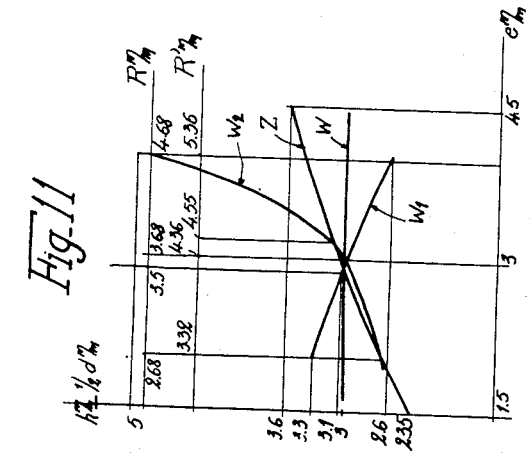
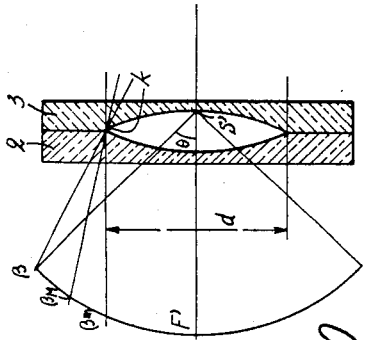
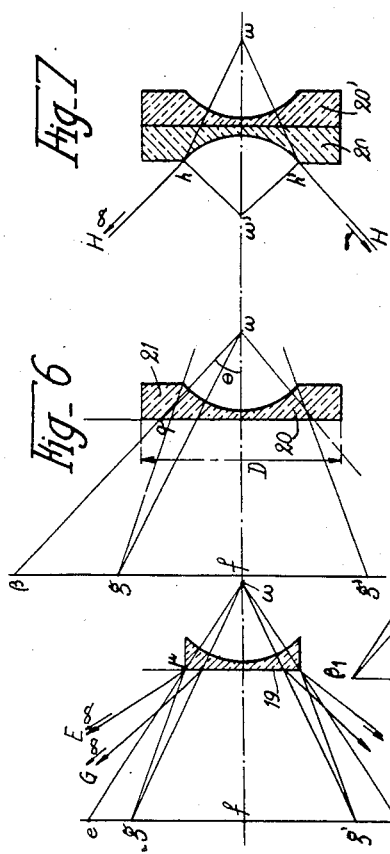
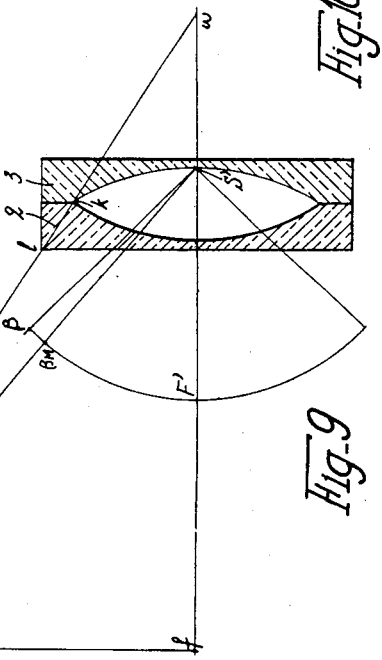
Jean Charles Joseph Blosse
Inventor
Attorney

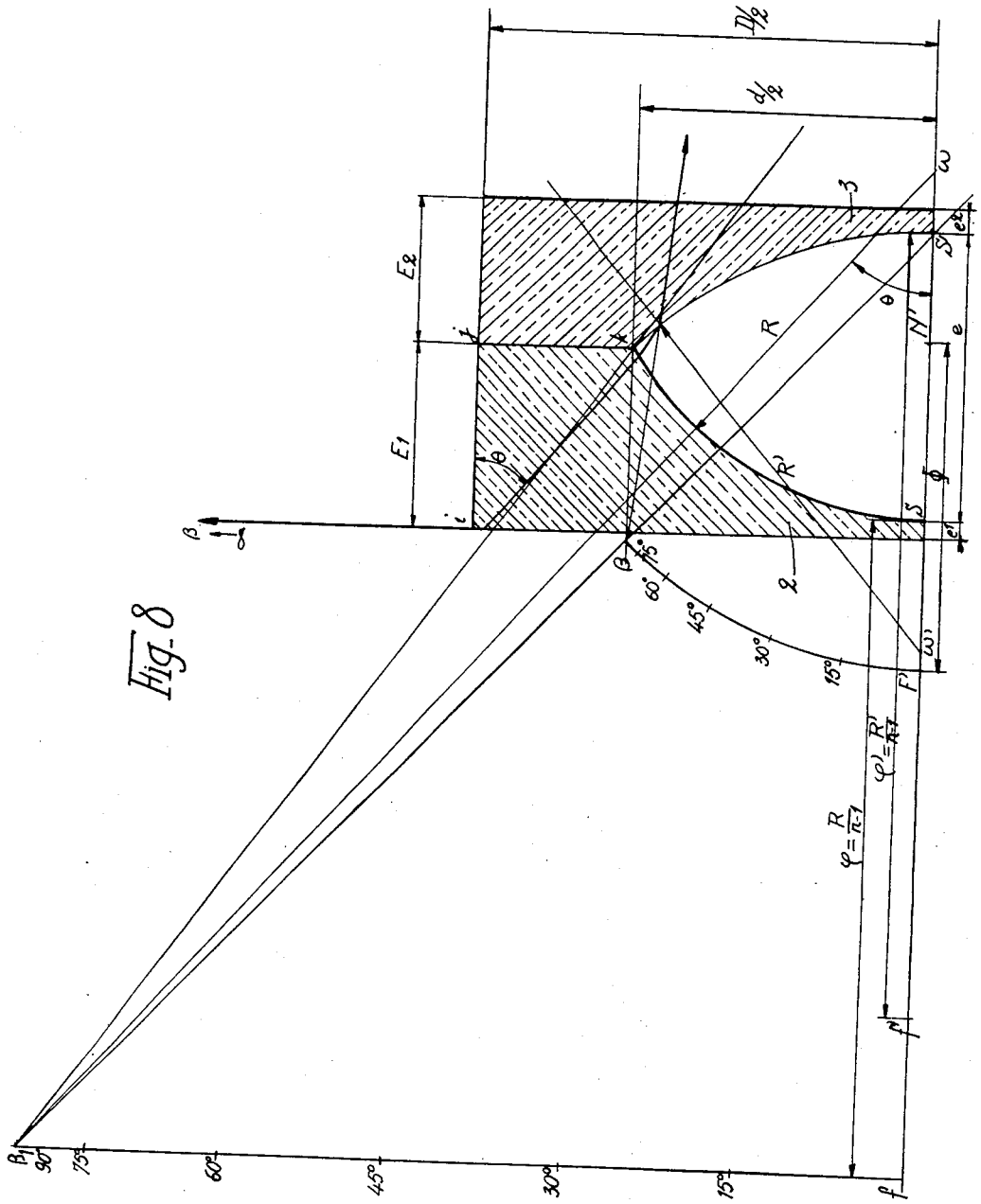

Patented Jan. 16, 1951

2,538,077

UNITED STATES PATENT OFFICE 2,538,077

OPTICAL VIEWER

Jean Charles Joseph Blosse, Sannois, France

Application March 24, 1949, Serial No. 83,204
In France May 27, 1948

6 Claims. (Cl. 88—57)

This invention relates to optical viewers, particularly adapted to the sight of objects through an opaque screen, such as a wall, door, etc., said viewers comprising a divergent objective and a convergent eye-piece, the whole producing a straight reduced virtual image of the objects sighted.

The optical viewers of this kind so far known possess generally a mediocre angle of vision, of about 90 degrees. One of the primary objects of this invention is to improve such devices in order to increase considerably the field of vision, so that the observer, placed on one side of a door, for instance, may see practically the entire space on the other side and detect eventually the presence of someone seeking to hide by hugging the door or the adjacent wall. Another object of the invention is to obtain a sharp, very luminous image, as large as possible and presenting the minimum deformations.

I have found that this result could be obtained by constructing an objective of appropriate focal curvature, while producing an inevitable but tolerable distortion of the image, which remains, however, bright and sharp up to its very edge.

Another object of the invention is to secure the foregoing advantages in viewers of small diameter, of the order of about 30 millimeters or less, which are practically invisible on the side of their objective.

According to the invention, the objective of the viewer is made up of two plano-concave lenses which are joined at their concave faces in order to form an air lens inside a sheet having parallel plane faces. The radius of curvature R of the concave face of the outer lens, its thickness at the rim $E_1$ and its dip $Z_1$ (the latter representing the difference between its thickness at the rim $E_1$ and its minimum thickness at the center $e_1$ as shown in Figure 8) and the useful diameter D of the objective are such that they satisfy the following relation:

$$\tfrac{1}{2}D \geq \sqrt{Z_1(2R-Z_1)} + \frac{E_1}{\sqrt{n^2-1}}$$

in which $n$ is the index of refraction of the glass used. Moreover, the useful aperture of the inner lens of the objective must be at least as great as that of the outer lens.

The mounting in which the viewer is set must not project beyond the plane outer face of the objective.

When the device corresponds to the foregoing conditions, the angle of the field of vision, with a suitable eye-piece, may reach a value close to the maximum, and at least about 175 degrees.

Moreover, if the focal distance is small enough for the entire focal surface to be contained within the cylinder tangent with the edge of the air lens, the eye-piece may have any focal distance and may, therefore, be located at any distance from the objective without preventing the field from reaching the maximum practical value of about 175 degrees, and this field may then be seen in its entirety without moving the eye outside the optical axis of the instrument. This result is obtained in practice when the diameter $d$ of the air lens satisfies the relation $$\tfrac{1}{2}d > \frac{R}{n}$$

or when the dip $Z_1$ or the outer lens of the objective satisfies the relation $$Z_1 > R\left(1 - \sqrt{1 - \frac{1}{n^2}}\right)$$

for usual focal distances of the eye-piece.

Other characteristics and features of the invention shall appear from the following description and by reference to the drawing which illustrates various embodiments of the invention, without limiting its scope.

Referring to the drawings:

Figure 1 is a longitudinal axial cross-section of a viewer according to the invention;

Figure 2 is an elevation of an optical bench for determining the focal curvature of an objective;

Figure 3 is a plan view corresponding to Figure 2;

Figure 4 is a diagram explaining the principles involved in the invention;

Figure 5 is a diagram showing the focal curvature of a classical plano-concave lens;

Figure 6 shows the improvement obtained in the field of vision of an ordinary plano-concave lens by the addition of a marginal ring having parallel faces;

Figure 7 illustrates what happens in the case of a bi-concave lens;

Figure 8 shows the focal curve of an air lens within a sheet having parallel faces, according to the invention;

Figure 9 and 10 illustrate the shape of the focal curve of a lens such as illustrated in Figure 8, in relation to the curvatures, thickness and diameter of the air lens;

Figure 11 is a diagram illustrating the variations of the focal curvature in function of other essential dimensions of a lens according to the invention.

As shown in Figure 1, a device according to the invention comprises a cylindrical mounting 1, on the fore end of which is mounted an objective formed by two plano-concave lenses 2 and 3, and having at its rear end a convergent eye-piece 4. Lenses 2 and 3 are so coupled that their concave faces are turned towards each other and form an air lens AL inside a sheet of glass having parallel faces.

The lens 3 may be inserted and glued within the fore end of the mounting and rests on a collar 5, which may also be used as a diaphragm for the objective. Outer lens 2 has preferably the same outer diameter D as inner lens 3 and is set against the latter in mounting 1. In no case should the fore end of the mounting project or protrude beyond the fore-face of the objective; otherwise field of vision of the device would be considerably reduced. Lens 2 may also have the same diameter as the outer diameter of the mounting 1 and be placed against lens 3.

For its use, the device is accurately set in a hole 6 provided in a door, wall or other screen 7, to allow the observer, looking from the right on Figure 1, to see the whole space located on the side of the screen opposite to that on which the observer is located.

By reference to Figure 1, the device object of this invention operates as follows:

The divergent objective formed by lenses 2 and 3 gives of a point A located at infinity on the optical axis a virtual image F' on the principal image focus. The image of points B and C at infinity on directions substantially at a 90 degree angle with the optical axis is formed at the secondary focuses $\beta$ and $\gamma$. The image of a point D at infinity in any direction is formed at the corresponding secondary focus $\delta$. Finally, the image of all points at infinity within the space located at the left (in Figure 1) of the viewer is a focal surface $\beta F'\gamma$.

The eye-piece 4, acting as magnifying glass, if it has a sufficient focal distance and therefore a sufficient depth of focus, can give simultaneously sharp images of the nearest points $\beta$, $\gamma$ and of the farthest points F' of the focal curve; the straight enlarged virtual image of the entire space on the left of the viewer (in Figure 1) is represented by curve $bdac$.

By suitable selection of objective 2, 3 the field of the viewer reaches 175 degrees, that is to say, that the angle between the two directions towards points B and C at infinity is equal to 175 degrees, so that an object or person can be seen by the observer even if said object or person is very close against wall 7. To obtain this result, the objective of the viewer must fulfill the following conditions:

1. The focal surface $\beta F'\gamma$ of the objective must correspond to the maximum possible field (175 degrees about).

2. This focal surface must, preferably, be entirely contained within a cylinder $\Gamma$ tangent with the edge of the air lens AL, having a diameter $d$.

To verify whether these various conditions are fulfilled, it is first necessary to determine the shape of the focal surface. This determination can be made by calculation, graphically, or experimentally.

For experimental determination of the focal surface, the optical bench shown in Figures 2 and 3 may be used. In those figures an objective-holder 8 is disposed on the vertical axis XY of the hinge of a support comprising two arms 9 and 10 which can be oriented with respect of each other. A collimator 11 lit in some way by a luminous source, not shown, is attached to arm 10 and comprises a small lighted hole which plays the part of an object point at infinity with respect of objective 2, 3. Chariot 12 can slide along arm 9 and a second chariot 13 carrying a microscope 14 can slide at right angles on chariot 12. The forward and backward movement of chariot 12 is controlled by a micrometric screw 15 and the lateral displacement of chariot 13 by a screw 16.

When the collimator 11 and the microscope 14 are disposed at the optical axis of objective 2, 3, the optical bench allows measurement by classical methods (for instance, the Cornu method) of the characteristic dimensions of the objective and especially its focal distance, as well as to locate the focuses, the principal planes, the optical center, etc.

In order to determine the focal curvature $\beta F''\gamma$ the operator changes the orientation of branch 10, notes for each angle measured on a fixed protractor 17, by means of an index 18, the distance $x$ between the microscope and the rear face of the objective, for instance, which is required to obtain a sharp image and the lateral displacement $h$ necessary to bring the image of the protractor on the intersection of the spider-lines of the microscope. The operator is thus enabled to measure the location of the corresponding secondary focus such as $\delta$ (Figure 1) and to trace on a diagram the curve $\beta F''\gamma$, locus of point $\delta$ when arm 10 revolves 90 degrees on each side of the optical axis around axis XY. The operator can thus verify that the field reaches 175 degrees, and by drawing the objective on the diagram at the same scale, he can verify whether the second condition mentioned above is fulfilled.

The following description discusses these conditions.

By reference to Figure 4, the simplest divergent objective is first considered, namely, a plano-concave lens 19 having a focal distance $Sf$ or $\varphi$ and the diameter D of which is temporarily undetermined. A point P at infinity, for instance, sends a ray $P_p$ which is refracted by the glass through the foreside plane face of the lens, according to the law $\sin i = n \sin r$.

For a point limit B at infinity in the plane of the plane face of the lens, the pencil of rays emerging from said point is refracted in the glass according to a pencil of parallel straight lines having a refraction angle $\theta$ such that $$\sin \theta = \frac{1}{n}$$

For ordinary glass ($n=1.53$), $\theta$ is approximately equal to 41 degrees.

The rays which emerge from the glass through the spherical diopter or refracting surface having a radius R are refracted into the air and seem to emerge from a point $\beta$ which is the image of point B in the lens and which is the secondary focus of the spherical diopter for the direction forming with the optical axis the angle $\theta$, so that: the focal distance of the diopter $S\theta\beta$ is equal to $$\frac{Rn}{n-1}$$

or to $\varphi n$, since the focal distance $$Sf \text{ or } \varphi = \frac{R}{n-1}$$

and $$\omega\beta = S\theta\beta + R = R\left(\frac{2n-1}{n-1}\right) = \varphi(2n-1).$$

When the index of refraction of the glass is 1.53, as is usual, the focal curve $f\beta$ of the simple plano-concave lens of Figure 4 is substantially a straight line. Point $\beta$ is, therefore, substantially at the intersection of the ray passing through the center of curvature $\omega$ of the diopter, making with the optical axis the angle $\theta$, with the plane at right angles to the optical axis on focus $f$ of the lens. Its construction is easy, since $$Sf = \frac{R}{n-1}$$

and $$\omega f = Sf + R = \frac{R}{n-1} + R = R\frac{n}{n-1}$$

It is also realized that, in order that the lens have a theoretical field of 180°, the ray $\beta\omega$ must exist; this implies that the half diameter $\frac{1}{2}D$ of the lens must be greater (when the thickness of the lens at the center is neglected) than $R\,tg\theta$, or $$\frac{R}{\sqrt{n^2-1}}$$

In practice, because of the reflection of the rays tangent to the plane surface of the lens, the maximum possible field does not exceed 175 degrees.

However, the whole of the field can be seen only if the image $\beta f$ is seen from point $\omega$, which would require that the optical center of the eye-piece 4 (Figure 1) should coincide with the center of curvature $\omega$ of the diopter under consideration. As one goes back along the optical axis, the field decreases. If the observer is on a point at infinity on the optical axis, the maximum field is determined by the intersection of the cylinder having for diameter the diameter D of the lens with the plane $f\beta$, which intersection gives the edge $\beta m$ of the maximum field. In the illustration shown in Figure 4, the refracted ray $\beta m\omega$ forms with the optical axis an angle of 18 degrees and the maximum field is: $2 \times 28 = 56$ degrees (sin 28° = 1.53 sin 18°).

In reality, the classical plano-concave lenses never have a diameter D satisfying the condition $$\frac{1}{2}D > \frac{R}{\sqrt{n^2-1}}$$

By reference to Figure 5, which shows such a practical lens, it can be seen that the extreme ray $\omega\mu$ meets the focal plane at $e$, which corresponds to a point E at infinity at an angle of about 55 degrees with the optical axis. The field in that case is, therefore, $2 \times 55$, or 110 degrees. But, if the observer so sets the eye-piece that the cone having its apex at the optical center of the eye-piece and its side generatrix touching the extreme edge $\mu$ of the objective, has a 40 degree angle of aperture, for instance, then this cone intersects the focal surface on a circle of diameter $gg'$ and the point G at infinity corresponding to point $g$ is on a line forming with the optical axis an angle of about 45 degrees (field of $2 \times 45$ degrees, or 90 degrees).

It can immediately be seen that the possible theoretical field can be improved and enlarged until it reaches about 180 degrees, and for all practical purposes about 175 degrees, by providing, as shown on Figure 6, on the entire periphery of a plano-concave lens 20 a ring 21 having parallel plane faces, such that the ray $\omega\beta$ forming an angle $\theta$ of 41 degrees with the optical axis intersects the plane face of the lens at a point $q$ the distance from which to the optical axis, measured at right angles to the latter, is at most equal to the half-diameter $\frac{1}{2}D$ of the lens. But in practice such a lens, used alone, only gives the field of about 175–180 degrees if the image $f\beta$ is seen from the optical center of the diopter; and, as stated heretofore, if the eye-piece is placed at a reasonable distance from the objective, the cone of aperture (40 degrees for instance) intersects the focal plane along the same circle $gg'$ referred to previously, which limits again the field to about 90 degrees.

As shown in Fig. 7, the coupling of two plano-concave lenses 20 and 20' through their plane faces does not increase the useful field, and moreover decreases the maximum theoretical field, because the outermost rays adapted to go through the two diopters are those which are tangent to the intake-diopter at points $hh'$ and the maximum field is represented by the angle of directions H$h$, H'$h'$. The same disadvantage obviously exists in the case of a sole plano-concave lens the concavity of which faces the space-object, case which is the reverse of that shown in Figure 5.

On the contrary, and according to the invention, by coupling two plano-concave lenses as shown in Figure 1 or in Figures 8 to 10, it is possible, if certain conditions are safeguarded, to obtain the maximum theoretical field.

As can be seen from Figure 8, the primary image of the entire space located on the left of the objective (in the figure) and given by the outer lens 2 of said objective is represented by a circle in the focal plane, at right angles with the optical axis at the focus $f$ of said lens, and having a radius $f\beta_1$. The final image $F'\beta$ is the image of $f\beta_1$ given by the inner lens 3 of the objective. One of the points $F'$ of said final image is known; it is the focus $F'$ of the entire objective, given by the formula:

$$\frac{1}{N'F'} = \frac{1}{Sf} + \frac{1}{S'f'} + \frac{SS'}{Sf \times S'f'}$$

in which S and S' are the summits of the diopters, $f$ and $f'$ the focuses of the lenses 2 and 3, and N' the nodal image point of the objective.

On the other hand it is known that if R and R' are the respective radii of curvature of diopters in lenses 2 and 3, then $$Sf = \frac{R}{n-1}$$

and $$S'f' = \frac{R'}{n-1}$$

If the maximum thickness of the air lens SS' is now called $e$, one obtains the following relation:

$$\frac{1}{N'F'} = \frac{n-1}{R} + \frac{n-1}{R'} + \frac{(n-1)^2 e}{RR'}$$

The position of the nodal image point N' is given by the formula:

$$S'N' = \frac{e \times S'f'}{Sf + S'f' + e}$$

Thus all the elements required to determine the position of point $F'$ are available.

On the other hand, it is now necessary to determine the position of point $\beta$. The ray $\beta_1 S'$ passing through the summit $S'$ of the diopter of plano-concave lens 3 is not deviated and the image of point $\beta_1$ given by lens 3, neglecting the thickness $e_2$ thereof, is on the straight line $\beta_1 S'$. Theory and experience show that the final focal curve $\beta F'$ is an arc of a circle having point $S'$ for center and $S'F'$ for radius, said radius being equal to $S'N' + N'F'$.

Finally, to construct the focal curve, from the point $f$, such that $$Sf = \frac{R}{n-1}$$

the perpendicular to the optical axis is drawn; and through the center of curvature ω of the diopter of the outer lens 2 another line is drawn which is at an angle θ with the optical axis such that $$\sin \theta = \frac{1}{n}$$

These two lines intersect at point $\beta_1$. Then the line $S'\beta_1$ is traced. The position of point $F'$ is determined by means of the formulas hereinabove and a circle is then traced which has $S'$ for center and $S'F'$ for radius and which intersects line $S'\beta_1$ at point $\beta$. The experimental curves determined by means of the optical bench of Figures 2 and 3 coincide with those traced according to the foregoing calculus and geometrical method within the degree of accuracy of the measurements. It is seen from Figures 1 and 8 that the image $F''\beta$ of the entire space on the left (on these figures) of the objective is visible irrespective of the point from which it is observed on the optical axis, since it is contained within a cylinder having for diameter the diameter $d$ of the air lens.

In order that this condition be fulfilled, the distance $h$ from the point $\beta$ to the optical axis must be equal to or smaller than the radius $d/2$ of the air lens, namely, $h$ must satisfy the relation $h \leq \frac{1}{2}d$.

It can be calculated that:

$$h = (2n-1) \frac{Sf \times S'f'}{Sf + S'f' + e} \times \frac{e + Sf}{e\sqrt{n^2-1} + Sf[n(2n-1) - (n-1)\sqrt{n^2-1}]}$$

and that in the case when $n=1.53$ (usual case for glass), $$h = 2.06 \frac{Sf \times S'f'}{Sf + S'f' + e} \times \frac{e + Sf}{1.16e + 2.53Sf}$$

and that $$(\tfrac{1}{2}d)^2 = \frac{e[2S'f'(n-1) - e]}{4[(Sf + S'f')(n-1) - e]^2} \times [4(n-1)^2 Sf^2 + 4(n-1)^2 Sf \times S'f' - 4(n-1)Sf \times e - 2(n-1)S'f' \times e + e^2]$$

Discussion of the relation $h \leq \frac{1}{2}d$.

This discussion shows that $h$ is larger as $Sf$ and $S'f'$ (and therefore R and R') are larger, and that it decreases relatively little when $e$ increases. On the other hand, $d$ increases first very rapidly when $e$ increases, then its rate of increase diminishes. Therefore, there exists a minimum thickness $e$ of the air lens for which $h \leq \frac{1}{2}d$, giving a field of vision of 175 degrees irrespective of the position of the eye-piece along the optical axis. As $e$ continues to increase from said minimum value, $h$ decreases, while $d$ increases up to a maximum and decreases afterwards, but there is no interest in choosing a thickness $e$ corresponding to the maximum value of $d$, because the diminution of the focal distance N'F' causes an excessive diminution of the size of the image $\beta F'$. Moreover, as the focal curvature increases, the deformation of the image increases. Finally the increase of $d$ brings about that of D, and consequently, of the overall dimensions of the viewer. In practice, there is no interest in exceeding for $e$ the value R.

It will be noted that the need of having a minimum value for the thickness $e$ or the air lens forbids the use of the arrangement of the two lenses in which the concave faces would both face the eye-piece, as a result of the increase of the focal distance, given by the following formula:

$$\frac{1}{N'F'} = \frac{1}{Sf} + \frac{1}{S'f'} + \frac{e}{Sf \times S'f'}$$

The preceding discussion can be simplified by noticing on Figure 8 that the luminous rays arising from point $\beta_1$, which are refracted parallel to the optical axis or form but a very small angle with the latter, are those which are above the straight line $\beta_1 \omega$. If the point $k$, extreme point on the diameter of the air lens, was on said line, point $\beta_1$ would not be visible from a point located on the optical axis beyond point $\omega$. From this, the following relation is easily reached:

$$\tfrac{1}{2}d > \frac{R}{n}$$

or, which amounts to the same thing, $$Z_1 > R\left(1 - \sqrt{1 - \frac{1}{n^2}}\right)$$

in which $Z_1$ is equal to $E_1 - e_1$.

On the other hand, the parallel faced ring surrounding lens 2 must have a diameter sufficient for the direction $ik$ to be inclined on the optical axis by angle $\theta$, and this is translated by the relation $$\tfrac{1}{2}D - \tfrac{1}{2}d \geq \frac{ij}{\sqrt{n^2-1}}$$

Assuming that $ij$ is equal to $E_1$, and substituting for $\tfrac{1}{2}d$ its maximum value $$\tfrac{1}{2}d = \tfrac{1}{2}D - \frac{E_1}{\sqrt{n^2-1}}$$

in the first relation stated in the second previous paragraph, the following relation is obtained:

$$E_1 < \left(\tfrac{1}{2}D - \frac{R}{n}\right)\sqrt{n^2-1}$$

This relation determines the upper limit of $E_1$ when R reaches its minimum admissible value.

For $n=1.53$, in the usual case of glass, the foregoing relations can be expressed as follows:

$d > 1.31R$
$Z_1 > R/4$
$E_1 < (\tfrac{1}{2}D - 0.655R)1.16$

Figure 9 shows that if the essential relation $$\tfrac{1}{2}D - \tfrac{1}{2}d \geq \frac{E_1}{\sqrt{n^2-1}}$$

is not satisfied, because D is too small with respect of $d$ and E, the ray $\omega kl$ farthest away from the optical axis defines with the latter an angle smaller than the limit angle of refraction, and the focal curve, rather than being fixed by straight line $S'\beta$, stops at straight line $S'\beta_m$. The maximum field of vision corresponding to point $\beta_m$ is considerably reduced; according to Figure 9, it is only $2 \times 56 = 112$ degrees.

Moreover, the distance $h$ above mentioned, related on Figure 9 to point $\beta_m$, is greater than $\tfrac{1}{2}d$, so that the foregoing field of 112 degrees, as small as it already is, is obtained only if the eye-piece is close enough to the objective. Such a device does not fall within the scope of this invention.

Figure 10 shows the alternative in which the relation $$\tfrac{1}{2}D - \tfrac{1}{2}d \geq \frac{E_1}{\sqrt{n^2-1}}$$

is more than satisfied, while the relations $d > 1.31R$ and $Z_1 > R/4$ are not. In that case the focal curve F'β does correspond to the maximum theoretical field, but it can be observed only by placing the eye-piece at a relatively short distance from the objective, as indicated by the direction of ray βk. A conical beam having an angle of aperture of 40°, as that shown in Figure 6, intersects the focal surface along a circle passing through point βm, giving a field of vision of about $2\times 52=104°$; at infinity on the optical axis, the field corresponding to the cylinder having diameter $d$ is given by point βm, and is only about $2\times 26=52°$.

The diagram of Figure 11 shows the effect of the variations of the various factors involved. In said diagram:

Curve Z shows the variations of the half-diameter $$\frac{d}{2}$$

of the air lens in function of its thickness $e$ for given radii of curvature $R$, $R'$. In the selected example, which is that of Example IV in the table hereafter, $R=3.68$ mm. and $R'=4.36$ mm. and $e$ varies from 1.3 to 4.5 mm. $\tfrac{1}{2}d$ increases from 2.35 to 3.6 mm.

Curve W shows the variations of $h$ in function of the thickness $e$ of the air lens. This curve is practically a horizontal line at 3.06 mm. for the ordinate of $h$.

Curve W₁ shows the variations of $h$ in function of $R$, assuming that $R'=4.36$ mm. and $\tfrac{1}{2}d=3.1$ mm. When $R$ increases from 2.68 to 4.68 mm., $h$ decreases from 3.3 to 2.6 mm. For $R=3.68$ mm., $h=3.06$ mm.

Curve W₂ shows the variations of $h$ in function of $R'$, assuming that $R=3.68$ mm. and $\tfrac{1}{2}d=3.1$ mm. When $R'$ increases from 3.36 to 5.36 mm., $h$ increases from 2.62 to 5.25 mm.; for $R'=4.36$ mm., $h=3.06$ mm.

To obtain the relation $h \leq \tfrac{1}{2}d$, it is necessary, when $R'=4.36$ mm., that $R$ be greater than 3.5 mm., and when $R=3.68$ mm., that $R'$ be smaller than 4.55 mm., as indicated by the intersections of curves W₁ and W₂ with curve Z.

These two conditions are expressed by the relation $R > 0.8R'$.

In summary, the conditions which the objective must fulfill to secure the field of 175 degrees are as follows:

The objective must consist of two plano-concave lenses coupled by their concave faces, having a marginal ring with parallel faces, and enclosing an air lens, the whole satisfying the relation $$\tfrac{1}{2}D - \tfrac{1}{2}d \geq \frac{E_1}{\sqrt{n^2-1}}$$

This relation can also be written as given in the forepart hereof, as $$\tfrac{1}{2}D \geq \sqrt{Z_1(2R-Z_1)} + \frac{E_1}{\sqrt{n^2-1}}$$

since $$\tfrac{1}{2}d = \sqrt{Z_1(2R-Z_1)}$$

this can be demonstrated geometrically by completing the circle of center ω and radius $R$, and considering the right triangle having for hypothenuse the diameter passing through Sω and for summit of right angle the point $k$, and calling W the end of said diameter-hypotenuse opposite to S; this gives $$(\tfrac{1}{2}d)^2 = Z_1(SW - Z_1) = Z_1(2R - Z_1)$$

or $$\tfrac{1}{2}d = \sqrt{Z_1(2R-Z_1)}$$

Additionally, and preferably, to allow maximum freedom with respect of the position of the eyepiece relative to the objective, the following relations should obtain:

$$\tfrac{1}{2}d > \frac{R}{n}$$

or $$Z_1 > R\left(1 - \sqrt{1 - \frac{1}{n^2}}\right)$$

$$e < R$$

and $$0.8R' < R < R'$$

In these relations $D$ is the diameter of the objective
$d$ is the diameter of the air lens
$E_1$ is the marginal thickness of the forward plano-concave lens of the objective
$n$ is the index of refraction of the glass
$R$ is the radius of curvature of the concave face of the forward lens 2
$R'$ is the radius of curvature of the concave face of the back lens 3
$e$ is the thickness of the air lens on the optical axis
$Z_1$ is the dip of the concave face of forward lens 2 along the optical axis An objective in which the focal curve βF'γ (Figure 1) is entirely contained within the cylinder Γ of diameter $d$ and tangent to the edge $k$ of the air lens (Figures 1 and 8) exemplifies the optimum objective since the entire image of the points at infinity on the left (in the drawings) of the screen 7 can be seen from the eye-piece irrespective of the latter's location relative to the objective along the optical axis, and the eye of the observer need not move at right angles to the optical axis.

It should be noted that if the forward face of lens 2 of the objective were convex instead of plane, the field would be reduced. Moreover, the convex face would cause such reflections of light that the device shown in Figure 1, as modified, would appear to anyone placed on the left (in the drawing) of the screen as a bright button, thus revealing the presence of the optical device; it is generally preferable, on the contrary, to make the device practically invisible.

The following examples illustrate the practical application of the invention, the dimensions given in the table being in millimeters:

|  | I | II | III | IV |
|---|---|---|---|---|
| External diameter of the mounting | 4.00 | 4.00 | 8.50 | 10.00 |
| Length of the device | 8.20 | 8.20 | 9.90 | 20.00 |
| External half diameter D/2 of lens 3 | 1.85 | 1.85 | 4 | 4.75 |
| Half-diameter d/2 of the air lens | 0.975 | 1.15 | 2.65 | 3.07 |
| Difference D/2 − d/2 | 0.875 | 0.70 | 1.35 | 1.68 |
| Total thickness of the parallel-faced sheet $E_1 + E_1$ | 1.01 | 1.47 | 2.61 | 3.50 |
| Thickness $e$ of the air lens | 0.75 | 1.04 | 2.01 | 3.00 |
| Lens 2: |  |  |  |  |
|   Radius of curvature $R$ | 1.35 | 1.40 | 3.68 | 3.68 |
|   Marginal thickness $E_1$ | 0.55 | 0.80 | 1.57 | 1.95 |
|   Value $\frac{E_1}{\sqrt{n^2-1}}$ | 0.475 | 0.691 | 1.35 | 1.68 |
|   Dip $Z_1$ | 0.42 | 0.59 | 1.12 | 1.70 |
|   Ratio $R/n$ | 0.88 | 0.914 | 2.40 | 2.40 |
| Lens 3: |  |  |  |  |
|   Radius of curvature $R'$ | 1.60 | 1.67 | 4.36 | 4.36 |
|   Marginal thickness $E_1$ | 0.46 | 0.67 | 1.05 | 1.55 |
|   Dip $Z_1$ | 0.33 | 0.45 | 0.89 | 1.30 |
|   Ratio $R/R'$ | 0.843 | 0.840 | 0.840 | 0.840 |
| Focal distance of the objective (measured) | 1.22 | 1.24 | 3.40 | 3.21 |
| Field (measured) degrees | 175 | 175 | 175 | 175 |

When the divergent objective has been selected according to the principles and measurements set forth heretofore, it is sufficient to associate with it a convergent eye-piece of suitable focal distance; in the case illustrated in Figure 10, this focal distance must be small enough to secure observation of the maximum field desired; in the case illustrated in Figure 8, any focal distance may be used, dependent solely upon the desired size for the virtual image $b\ a\ c$ (Figure 1).

It should be noted that the image $b\ a\ c$ is distorted, as if the object seen by the observer were applied onto a sphere. This distortion cannot be avoided, but experience demonstrates that it does not prevent the easy identification of the objects and especially of the persons observed through the viewer. In any case, the eye-piece is such that it has an object focus adjacent that image focus of the objective, a diameter not less than substantially the internal diameter of the mounting of the viewer, and a focal length which will give at normal vision range a sharp enlarged virtual image of the image formed by the objective.

The determination of the characteristics of such an eye-piece, according to optical laws, presents no difficulties.

In practice, the viewer can be built in the shape of a small pencil-size or fountain-pen-size cylinder; this device, once placed in a door, wall, etc., is practically invisible, as a result of its small size and of the plane forward face of the objective, which reduces light reflections to the minimum. The diameter of the mounting for the lenses varies generally from about 30 mm. down to about 4 mm., and in the latter size, the viewer looks like a dark spot resembling the head of a tack or nail.

The lenses described above can be made of glass or transparent plastics, by cutting or molding.

The viewer can be used in many ways: for domestic uses, for military use (sight through armor), photography (wide field sighter), etc.

I claim as my invention:

1. An optical device adapted to be inserted in a hole made in an opaque obstacle and having an angle of vision of about 175°, said device comprising a tubular mounting; a divergent objective giving an upright virtual image of an object and secured to one end of said mounting, said objective being formed by two adjacent plano-concave lenses the concave faces of which are turned toward each other and define a central air lens and being so arranged that no portion of the mounting projects beyond the plane outer face of said objective; and a convergent eye-piece mounted on the other end of said mounting coaxially with said objective, said eye-piece having an object focus adjacent the image focus of said objective, a diameter not less than substantially the internal diameter of said mounting, and a focal length giving at substantially normal vision distance a sharp enlarged virtual image of the image formed by said objective, and said objective having characteristic dimensions satisfying the formulas:

$$\tfrac{1}{2}D - \tfrac{1}{2}d \geq \frac{E_1}{\sqrt{n^2-1}}$$

and $$\tfrac{1}{2}D \geq \frac{R}{\sqrt{n^2-1}}$$

in which formulas the letters and symbols bear the following meaning:

$D$ is the useful outer diameter of the objective;
$d$ is the diameter of the air lens;
$R$ is the radius of curvature, of the outer plano-concave lens of said objective;
$E_1$ is the marginal thickness of the outer plano-concave lens of said objective; and
$n$ is the refraction index of the material with which the objective is constructed.

2. An optical device as claimed in claim 1 in which the focal surface of the objective is contained inside a cylinder tangent with the periphery of said air lens and in which said characteristic dimensions also satisfy the formula:

$$\tfrac{1}{2}d \geq \frac{R}{n}$$

3. An optical device as claimed in claim 2 in which the thickness of the air lens on the optical axis is smaller than the radius of curvature of the outer lens of said objective, and said radius of curvature is greater than eight-tenths of the radius of curvature of the inner lens of said objective, but smaller than said latter radius.

4. An optical device as claimed in claim 1 in which the thickness of the air lens on the optical axis is smaller than the radius of curvature of the outer lens of said objective, and said radius of curvature is greater than eight-tenths of the radius of curvature of the inner lens of said objective, but smaller than said latter radius.

5. A divergent objective, adapted to be used in optical viewers, having an angle of vision of about 175° and giving an upright virtual image of an object, consisting of two adjacent plano-concave lenses the concave faces of which are turned toward each other and define a central air lens, and having characteristic dimensions satisfying the formulas:

$$\tfrac{1}{2}D - \tfrac{1}{2}d \geq \frac{E_1}{\sqrt{n^2-1}},\ \tfrac{1}{2}D \geq \frac{R}{\sqrt{n^2-1}}$$

and $$\tfrac{1}{2}d \geq \frac{R}{n}$$

in which formulas the letters and symbols have the following meaning:

$D$ is the useful outer diameter of the objective;
$d$ is the diameter of the air lens;
$R$ is the radius of curvature of the plano-concave lens of said objective nearest the object;
$E_1$ is the marginal thickness of said last-named lens, and
$n$ is the refraction index of the material with which the objective is constructed.

6. A divergent objective as claimed in claim 5 in which the thickness of the air lens on the optical axis is smaller than the radius of curvature of the lens of said objective nearest the object, and said radius of curvature is greater than eight-tenths of the radius of curvature of the other lens of said objective, but smaller than said latter radius.

JEAN CHARLES JOSEPH BLOSSE.

(References on following page)

REFERENCES CITED

The following references are of record in the file of this patent:

UNITED STATES PATENTS

| Number | Name | Date |
|---|---|---|
| 1,499,018 | Hertel | June 24, 1924 |
| 1,632,679 | Rhodes | June 14, 1927 |
| 2,080,120 | Everett | May 11, 1937 |
| 2,130,347 | Holst et al. | Sept. 20, 1938 |
| 2,169,874 | Hardt | Aug. 15, 1939 |
| 2,262,203 | Redstone et al. | Nov. 11, 1941 |
| 2,274,116 | Wright | Feb. 24, 1942 |
| 2,312,542 | Goodman | Mar. 2, 1943 |
| 2,373,815 | Del Riccio | Apr. 17, 1945 |